F. C. PERKINS.
PROCESS AND APPARATUS FOR WELDING.
APPLICATION FILED NOV. 29, 1910.
1,037,979.
Patented Sept. 10, 1912.
3 SHEETS—SHEET 1.
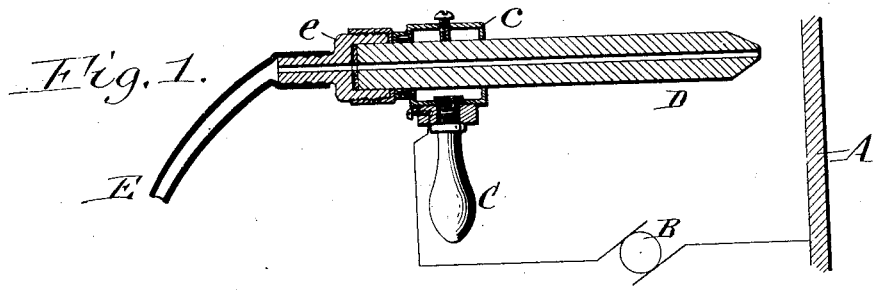
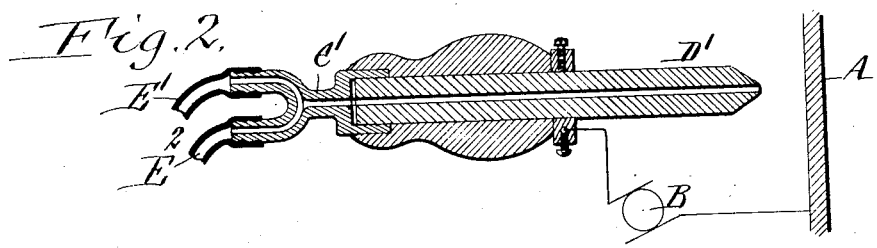
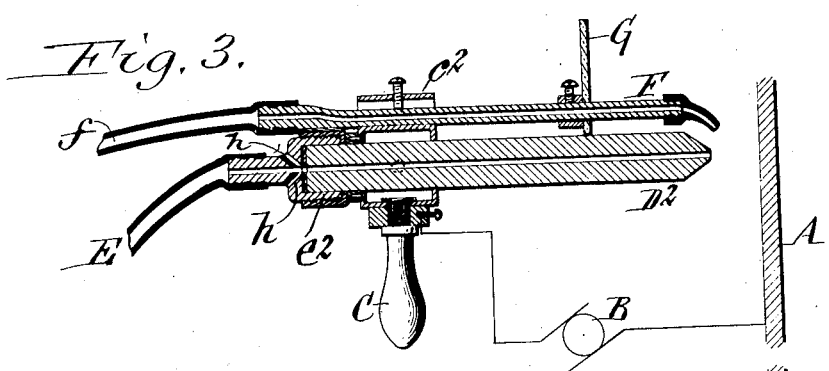
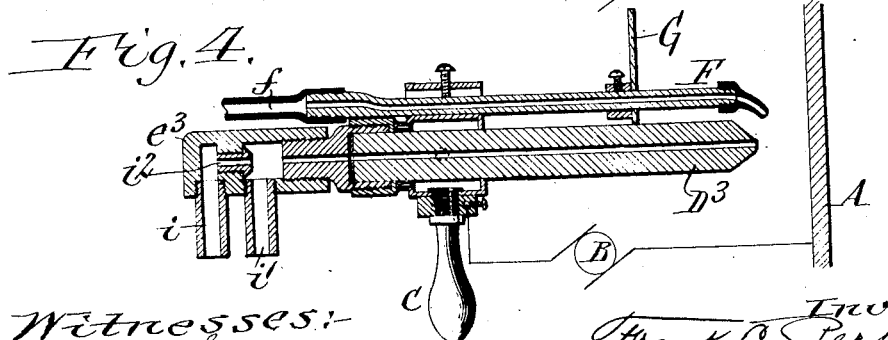

F. C. PERKINS.
PROCESS AND APPARATUS FOR WELDING.
APPLICATION FILED NOV. 29, 1910.
1,037,979.
Patented Sept. 10, 1912.
3 SHEETS—SHEET 2.
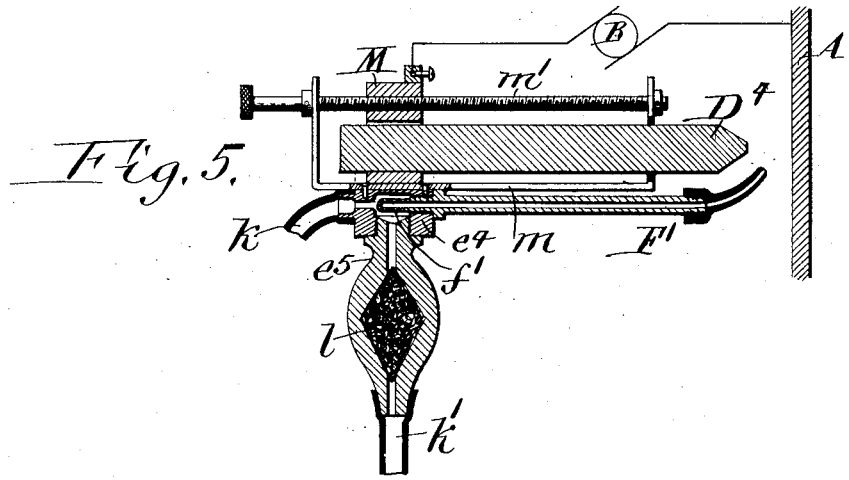
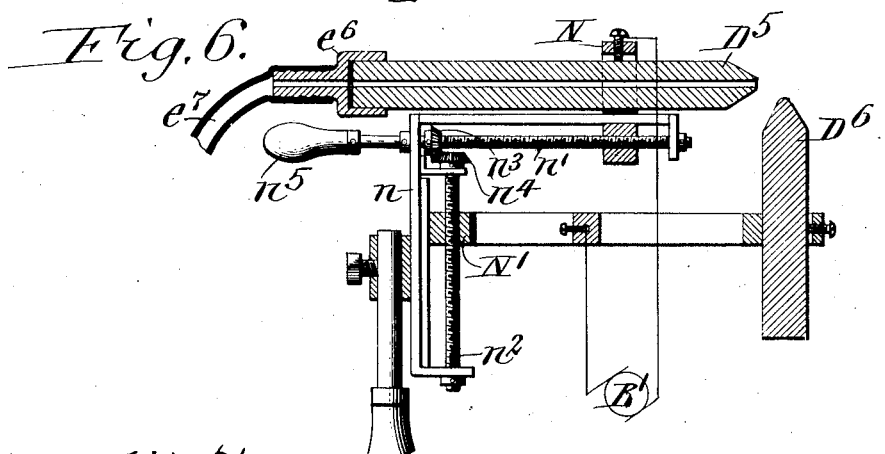
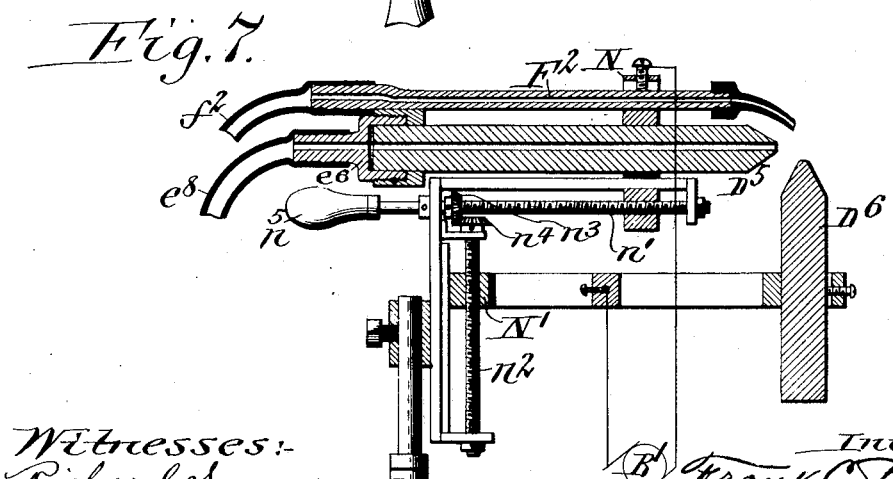

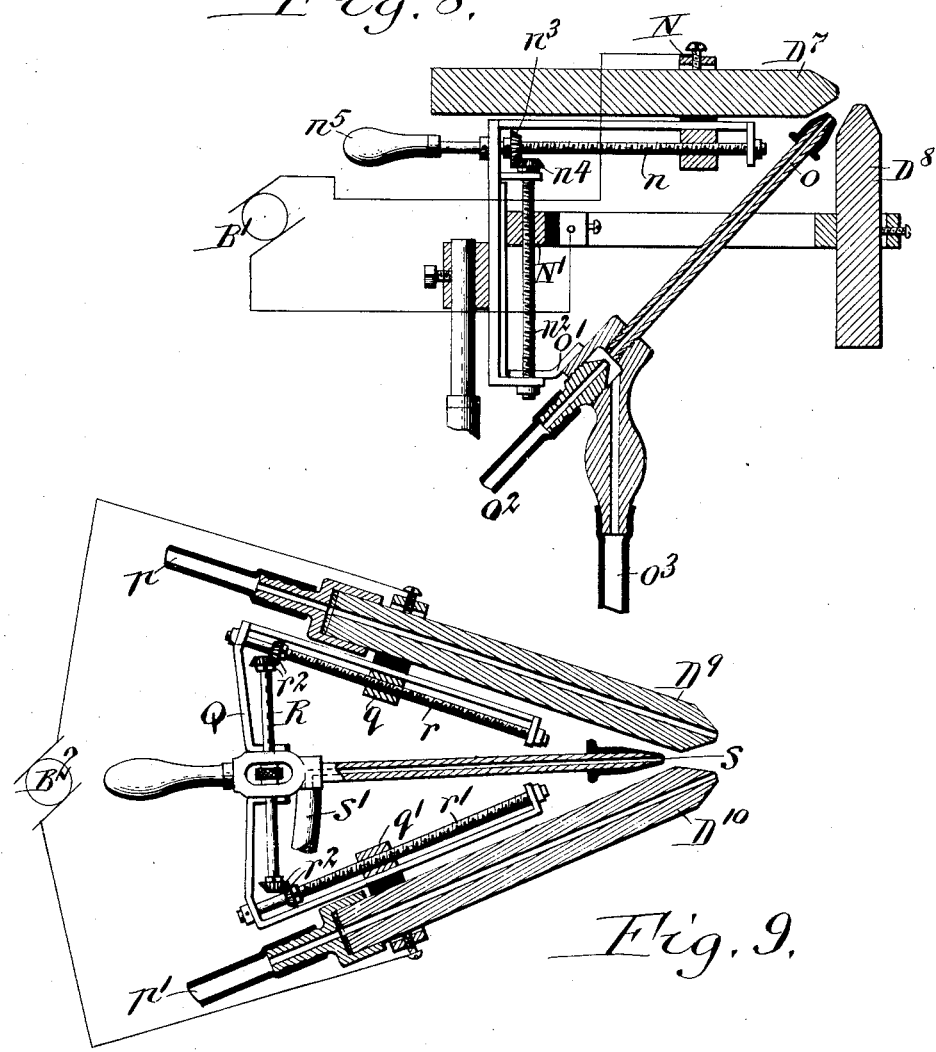

UNITED STATES PATENT OFFICE.

FRANK C. PERKINS, OF BUFFALO, NEW YORK.

PROCESS AND APPARATUS FOR WELDING.

1,037,979.  Specification of Letters Patent.  Patented Sept. 10, 1912.

Application filed November 29, 1910. Serial No. 594,681.

*To all whom it may concern:*

Be it known that I, FRANK C. PERKINS, a citizen of the United States, residing at Buffalo, in the county of Erie and State of New York, have invented new and useful Improvements in Processes and Apparatus for Welding, of which the following is a specification.

This invention relates to an improved process and apparatus for welding, cutting, fusing or melting steel, aluminum, brass, bronze, cast iron or other metals by the combined use of an electric arc and oxygen gas or air with acetylene, hydrogen and oil or other gases in combination with oxygen or air and in connection with the electric arc blow pipe or torch.

In the accompanying drawings consisting of three sheets: Figure 1 is a longitudinal section showing my invention embodied in a torch having a single tubular electrode provided with means for supplying but one kind of gas thereto. Fig. 2 is a similar view showing a tubular electrode provided with means for supplying two kinds of gas thereto. Fig. 3 is a similar view of a torch comprising a single hollow electrode supplied with one kind of gas and tubular cutting tip. Fig. 4 is a torch similar to that shown in Fig. 3 excepting that the hollow electrode is supplied with two kinds of gas. Fig. 5 is a similar view showing my invention embodied in a torch containing a solid electrode and hollow cutting tip supplied with two kinds of gas one of which is adapted to pass through a safety screen. Fig. 6 is a similar view showing my invention embodied in a torch having a tubular electrode supplied with one kind of gas and a coöperating solid electrode. Fig. 7 is a similar view of a torch like that shown in Fig. 6 with the addition of a gas fed hollow cutting tip. Fig. 8 is a similar view showing an adaptation of my invention in which two solid electrodes are employed in connection with a tubular tip which is supplied with two kinds of gas. Fig. 9 is a view similar to Fig. 8 but showing the tip supplied with one kind of gas and two electrodes made hollow and each supplied with one kind of gas.

Similar letters of reference indicate corresponding parts throughout the several views.

Referring to the construction shown in Fig. 1, A represents the sheet of metal or other body which is to be cut, welded or similarly treated by the application of my invention, and B represents an electric source preferably a dynamo electric generator or transformer one side of which is connected with the article to be treated, so that the latter forms one electrode of an electric arc. The torch shown in Fig. 1 comprises a metal holder $c$ connected with the other side of the electric generator and forming a terminal thereof, a handle $C$ of insulating material connected with the holder, a hollow or tubular electrode $D$ of carbon, aluminum, iron or the like, mounted on said holder so as to be in electrical connection with the generator, and a hose or tube $E$ which is connected with the rear end of the electrode by means of a coupling $e$ and whereby either oxygen or air under low, high or moderate pressure may be supplied to the electrode.

In using this apparatus the front end of the carbon or metal electrode is first engaged with the article to be treated while the generator is in operation and then the electrode is withdrawn from the article sufficient to form an electric arc between the same. Into this arc is delivered the oxygen or air escaping from the front end of the hollow carbon electrode, thereby producing a flame by the combination of the electric arc and the combustion of the oxygen or air the heating effect of which is greater than either—the heat of the electric arc or the heat of the burning gas considered by themselves.

In cutting a sheet of metal or a metal casting the electric source is preferably connected with the article, so that the latter forms the positive terminal and the carbon electrode is connected with the other side of the generator so as to form the negative terminal. By this means the object under treatment forming the positive terminal becomes hottest and melts most rapidly when using a direct current while the electrode forming the negative terminal becomes less hot and wears away at a lower rate.

In the construction shown in Fig. 2 the rear end of the electrode $D^1$ is connected by a coupling $e^1$ with two separate tubes $E^1$, $E^2$, one of which may supply oxygen and the other hydrogen or acetylene to the hollow electrode for producing a combined electric arc and a oxy-hydrogen or oxy-acetylene flame at the front end of the electrode for melting the body or plate under treatment.

The torch shown in Fig. 3 is substantially like that shown in Fig. 1 with the addition of a tubular cutting tip F mounted on the holder $c^2$ and terminating at its front end close to the front end of the electrode $D^2$ and connected at its rear end with a tube $f$ whereby a hydrocarbon oil, acetylene or a gas composed of oxygen and hydrogen or oxygen and acetylene may be supplied to the tip for producing a flame at the front end of the latter in addition to the oxygen flame issuing from this electrode and the electric arc between the electrode and the body operated upon. The torch shown in Fig. 3 also contains an adjustable shield G, preferably of blue glass or mica mounted on the front parts of the electrode and the cutting tip for protecting the eyes of the operator from the effects of the intense heat which is developed by the torch. External air may also be admitted to the rear end of the electrode for admixture with the gases or other fuel entering the same by means of openings $h$ in the coupling $e^2$.

The torch shown in Fig. 4 is like the one shown in Fig. 3 with the exception that the rear end of the tubular electrode $D^3$ is connected by a coupling $e^3$ with two tubes $i, i^1$ one of which supplies oxygen and the other hydrogen or other gas, the gases supplied by these tubes being mixed by a jet $i^2$ in the coupling $e^3$ before entering the electrode $D^3$.

Instead of making the electrode of tubular form, as shown in Figs. 1–4, the same may be made solid, as shown at $D^4$ in Fig. 5, and an adjustable or sliding tubular cutting tip $F^1$ may be employed for directing a gas to the front end of the solid electrode. At its rear end the tip $F^1$ is conected by a coupling $e^4$ with a tube $k$ which supplies oxygen under high pressure and by a coupling $e^5$ with a tube $k^1$ which supplies acetylene or hydrogen at low pressure, these gases being mixed at the junction of the couplings $e^4$, $e^5$ before entering the rear end of the tip $F^1$ which latter is perforated, as shown at $f^1$ in Fig. 5. The coupling $e^5$ is provided in its conduit with a screen $l$ preferably of suitable porous material which prevents the flame of the torch from flashing back. Means are also provided in the construction shown in Fig. 5, whereby the electrode may be fed forward so that its front end as it is consumed may be retained in the proper relation to the front end of the tip $F^1$. This electrode adjusting mechanism, as shown in this figure, comprises a carriage or slide M secured to the rear end of the electrode and movable lengthwise on the holder $m$, and an adjusting screw $m^1$ working in a threaded opening in the slide M and journaled in bearings on the holder. Upon turning the screw the carriage is moved lengthwise and the front of the electrode is adjusted relatively to the front end of the tip $F^1$ as the adjustable tip carbon burns away.

In Fig. 6 is shown a torch in which two electrodes $D^5$, $D^6$ are employed and in which these electrodes form the arc terminals of the electric generator $B^1$ instead of utilizing the body under treatment as one of the terminals. These electrodes are arranged at right angles to one another and one of them $D^6$ is solid and the other $D^5$ is of tubular form and connected at its rear end by a coupling $e^6$ with a tube $e^7$ which supplies air or other gas. These electrodes are adjustable relatively to each other, so that as the front ends of the same are consumed or worn away by the arc formed between the same these ends may be engaged for closing the circuit preparatory to forming the arc and the same may also be maintained at the proper distance apart. The means for this purpose shown in Fig. 6 comprise two carriages N, $N^1$ which slide at right angles relatively to each other on a holder $n$ and which support the electrodes $D^5$, $D^6$ respectively, two screws $n^1$, $n^2$ working respectively in threaded openings in the carriages N, $N^1$ and journaled at right angles to each other in bearings on the holder $n$, and intermeshing bevel wheels $n^3$, $n^4$ secured respectively to the screws $n^1$, $n^2$. The upper screw $n^1$ is provided with a handle $n^5$ which when turned causes both screws to shift the electrodes by drawing back on handle $n^5$ and disengaging the bevel gears the upper carbon alone may be moved forward or backward.

The construction shown in Fig. 7 is substantially like that shown in Fig. 6 with the addition of a cutting tip $F^2$ which is mounted on the carriage of the tubular electrode and arranged with its front end close to the front end of the tubular electrode while its rear end is connected with a supply tube $f^2$. In such an organization oxygen is supplied by the tube $f^2$ to the cutting tip and hydrogen or acetylene is supplied to the tubular electrode by the tube $e^8$.

The construction or torch shown in Fig. 8 is substantially like that shown in Fig. 6 with the exception that the electrodes $D^7$, $D^8$ are both solid and a gas delivery tip or nozzle $o$ is mounted on the electrode holder $o^1$ and arranged at its front end between the front ends of the electrodes while its rear end is connected with two tubes $o^2$, $o^3$ one of which, $o^2$, is designed to supply oxygen and the other $o^3$ hydrogen or acetylene.

The construction of torch shown in Fig. 9 comprises two tubular electrodes $D^9$, $D^{10}$ which form the terminals of an electric source $B^2$ and which are arranged at an angle relatively to each other and connected at their rear ends with tubes $p$, $p^1$ one of the latter supplying air or oxygen and the other oil, vapor, hydrogen or acetylene, carriages $q$, $q^1$ slidable on a holder Q and supporting the electrodes, screws $r$, $r^1$ journaled on the holder and working in threaded openings in the carriages, and adjusting shaft R journaled on the holder and connected by two pairs of bevel wheels $r^2$ with the adjusting screws $r$, $r^1$, and a gas delivery tip or nozzle $s$ mounted on the holder and arranged at its front end between the front ends of the electrodes while its rear end is connected with a tube $s^1$ adapted to supply oxygen, hydrogen, acetylene, air, oil, vapor or a combination of some of these.

It is well known that the highest temperature of the best solid fuel torches is about 3,000 degrees F. while oxy-hydrogen blow pipes produce gas flames of 4,000 degrees F. and the oxy-acetylene torch produces a flame of about 6,300 degrees F. or a temperature about 200 degrees less than the electric arc. As the electric arc produces the highest known temperature of from 6,000 to 7,000 degrees F., the present invention provides a means of taking advantage of the extreme high temperature of both the electric arc and the oxygen blow pipe flame with acetylene, hydrogen or other gases burning in combination within the same restricted area as the electric arc.

This invention provides means for obtaining the very highest temperature possible, the energy of the electric arc being expended together with the oxygen and acetylene gases within the same restricted area, higher than that of either process when working alone.

It is possible with this invention of the electro-oxygen arc torch to operate with any degree or quantity of heat by working with the gases alone, or with the arc or the arc with any variable amount of current alone. The extraordinary cutting powers of the electro-oxygen arc torch are apparent and its advantages are obvious when considering that by its use it is possible to cut out the solidified iron or steel from blast furnaces and open hearth furnaces where the charges have been hardened or frozen by accident.

It is well known that the oxygen blowpipe or torch has been used to advantage for cutting in such cases but is necessary to first heat by means of gases the solid iron at the mouth of the blast furnace to a very high temperature of several thousand degrees before the high pressure oxygen cutting tip will operate. By using the electric arc in the electro-oxygen torch the high temperature necessary for use with oxygen is attained immediately on striking the arc, the metal of the blast furnace being connected with a positive source of electricity and the electrode of the oxy-arc torch with the negative electrode, direct current being preferred but alternating also doing the work. Almost as soon as the arc has been formed the oxygen cutting gas may be used, the oxygen passing either through the carbon electrode itself as indicated, for instance in Fig. 1 or through a separate tip, as shown for instance in Fig. 3. The cost of acetylene and hydrogen gases is high and they are difficult to obtain without special apparatus in many cases. By means of the electro oxy-arc torch oil, gas, gasolene, natural gas or ordinary illuminating gas may be employed to advantage in many classes of work without the expense of the former gases pure oxygen and in some cases air being supplied to support combustion. With the electro-oxy-arc process herein described it is possible to concentrate within a very small area temperatures of 6,500 degrees F., or over, and to reduce very quickly a small portion of any metal to a molten state. For use in welding with this electro-oxygen blow pipe or torch, as with the oxy-hydrogen or oxy-acetylene gas process the union is made by the two metals simply flowing together there being no necessity for the use of fluxes or for the application of pressure. In this electro-oxy-arc process it is possible to confine the heating and flowing of the molecules of metal within a small area generating at the same time sufficient heat to make compression unnecessary, thus greatly simplifying the process of welding metal.

While the electric arc alone has heretofore been utilized for electric welding and cutting, it has not been entirely controllable as to temperature by varying the amount of current at the arc nor has it been at all times possible properly to direct the heat to the points desired. In the same manner the oxy-acetylene and oxy-hydrogen gas blow pipe processes have heretofore not attained the possible success of the electro oxy-arc process in cases where greater intensity of heat might be desired.

Aluminum, aluminum alloy with flux, iron composite or other hollow or solid metal electrodes may be used in place of carbon in certain cases where such metals may act as solder in filling up holes in castings, in brazing or welding, the electrode being fed forward as it disintegrates.

It is well known that the electric arc has a refining action on iron and steel and other metals and this may be taken advantage of in the electro-oxy-arc process using composite electrodes burning out carbon with an oxidizing flame or adding carbon or other elements with a reducing flame, changing the quality of the iron, steel, or other metal in local spots where those places should have a different grade of metal, as to hardness, softness, etc., this being effected, for instance, by introducing titanium, vanadium or other rare metal for changing the character, toughness or quality of those parts.

It is well known that the oxy-hydrogen blow pipe cannot secure a temperature greater than 4,000 degrees F., or thereabouts, because oxygen and hydrogen will not unite at temperatures above the dissociation point of water. As hydrogen and carbon both make up the endothermic gas, acetylene, which is used with oxygen in the blow pipe, these elements are dissociated at the flame, the carbon burning, and it is held that hydrogen does not combine at the high temperature produced with the oxygen but forms a protecting cone at the nozzle of the blow pipe, the maximum temperature being produced where the carbon is burning, thus producing the intense heat of the well known oxy-acetylene flame. The electro-arc-oxygen torch used in the present invention takes advantage of this fact that the highest known temperatures are obtained by the combustion of carbon and oxygen, the carbon of the electrode and of gas passing through it and in the metal being cut or welded, combined with the electric heat energy in the arc producing the most intense heat ever before known within the same limited area. As the hydrogen in the oxy-acetylene flame is not utilized, but only the carbon, it is held that the carbon necessary may be introduced by other gases containing carbon of less cost and by the carbon electrode itself through the carbon vapor in the arc.

By combining in the electro-oxy-arc process the use of the electric arc and the oxy-acetylene flame, it is believed a more intense heat may be obtained, a greater amount of energy being consumed in a restricted area, and better controlled, than with either the electric arc or the gas process alone. By controlling the number of amperes in the electric arc and by altering the quantity, pressure and proportion of oxygen and acetylene in the welding and cutting flame it is held that a remarkable variation of quality, quantity and intensity of flame may be provided, the flame being of an oxidizing or carburizing or neutral nature as desired depending upon the control of the flow of the mixture.

It is stated that one pound of acetylene produces about 20,000 B. T. U. when burning with oxygen and one pound of steel produces about 3,000 B. T. U. when burning with oxygen while in the electric arc the B. T. U. produced varies with the number of watts used. In cutting or welding steel with an electric arc and oxy-acetylene gas combined, the B. T. U. produced in the same small area is undoubtedly far greater than were either employed alone. The electro-oxy-arc process also includes the combined use of the electric arc with a mixing of oxygen with other gases in a torch of high pressure, moderate pressure or low pressure, the mixture of these gases before combustion at the tip being so arranged as to provide against "flashbacks" and by other simple means as the use of finely divided or porous material or gauze wire through which the gases must pass, thereby effectually preventing the propagation of flame in the case of flashback. In the ordinary acetylene blow pipe the gases are mixed under low pressure on the principle of the injector, the oxygen under higher pressure than the acetylene, drawing a certain amount of the latter with it through the tip where it burns. The consumption of oxygen is more nearly double that of acetylene in the low pressure torch than in the high pressure blow pipe in which the proportion of oxygen and acetylene is nearly the same, the efficiency and economy of the high pressure arrangement thus noted being due to the two gases striking at right angles in mixing and producing a more homogeneous combination. The oxygen is used under a pressure varying up to 200 pounds per square inch, the higher pressures being used in cutting service while the acetylene gas is employed under low pressure of two pounds or less. If desired the screen $l$ shown in Fig. 5 may be associated with each of the constructions shown in other figures, for instance, the same may be interposed between each of the pipes $p$, $p^1$ and its companion hollow carbon $D^9$, $D^{10}$ shown in Fig. 9.

I claim as my invention:

1. The herein described process of fusing matter consisting in simultaneously subjecting the same to the heat of an electric arc and a flame together with a jet of cutting gas.

2. The herein described process of fusing matter consisting in forming an electric arc between the electrode and the matter to be fused and directing a flame into said arc together with a cutting jet of a combustion supporting gas.

3. An apparatus for fusing matter comprising an electrode adapted to form one terminal of an electric arc and means for delivering a combustible gas to said arc together with means to conduct a separate jet of cutting gas.

4. An apparatus for fusing matter comprising a tubular electrode adapted to conduct a combustible element to the front end thereof and a separate conduit adapted to conduct a cutting gas to the front end of the electrode.

5. An apparatus for fusing matter comprising a pair of electrodes constituting the terminals of an electric circuit and adapted to form an arc between them and one of said electrodes being of tubular form and adapted to conduct a combustible element to the front ends of said electrodes together with means to conduct a cutting jet of a combustion supporting gas.

6. An apparatus for fusing matter comprising a pair of electrodes constituting the terminals of an electric circuit and adapted to form an arc between them and both of said electrodes being of tubular form and adapted to conduct combustible elements to the front ends thereof.

7. An apparatus for fusing matter comprising a pair of electrodes constituting the terminals of an electric circuit and adapted to form an arc between them and both of said electrodes being of tubular form and adapted to conduct combustible elements to the front ends thereof and a separate conduit adapted to deliver a combustible element at the front ends of said electrodes.

8. An apparatus for fusing matter comprising a pair of hollow electrodes adapted to form an arc between them and to conduct combustible elements to the front ends thereof, means for adjusting said electrodes relatively to each other, and a separate conduit for conducting an additional combustible element to the front ends of said electrodes.

Witness my hand this 28th day of November, 1910.

FRANK C. PERKINS.

Witnesses:
 NELLIE SMITH,
 ALFRED BORKENHAGEN.